Jan. 1, 1946.  H. A. KNOX  2,391,907
TRACK SHOE
Filed April 20, 1942  2 Sheets-Sheet 2
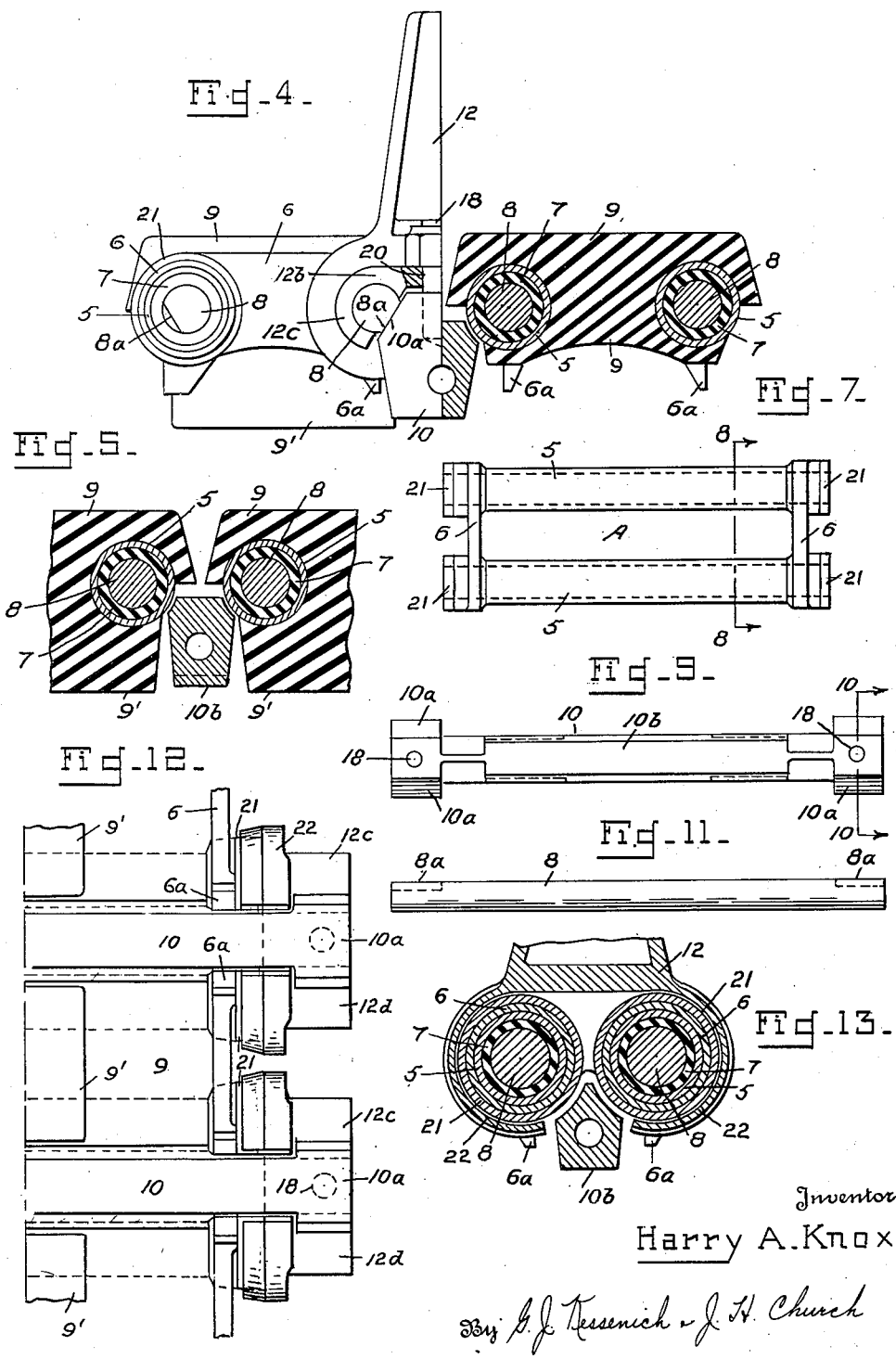
Inventor
Harry A. Knox Patented Jan. 1, 1946

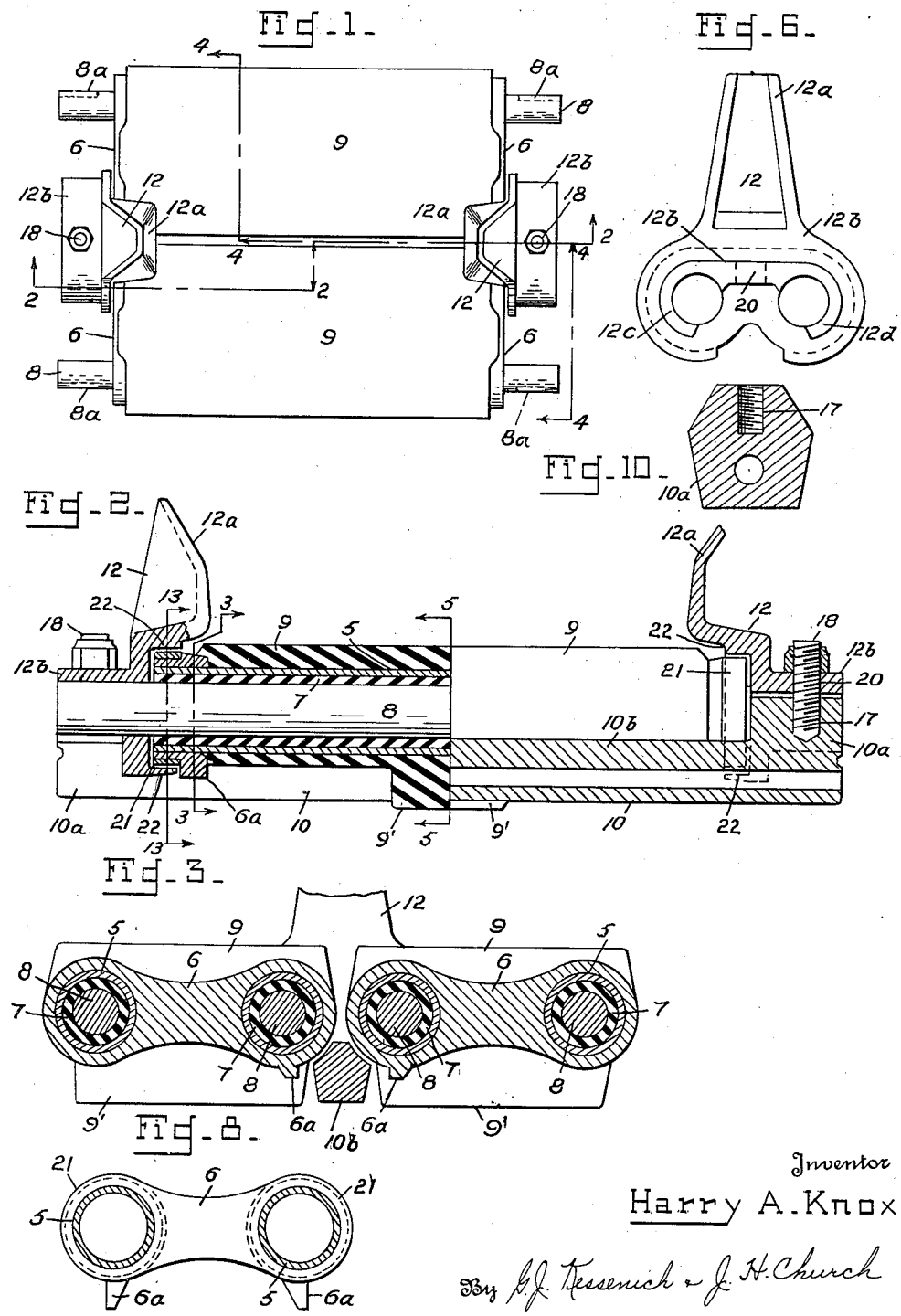

2,391,907

UNITED STATES PATENT OFFICE 2,391,907

TRACK SHOE

Harry A. Knox, Washington, D. C.

Application April 20, 1942, Serial No. 439,655

7 Claims. (Cl. 305—10)

(Granted under the act of March 3, 1883, as amended April 30, 1928; 370 O. G. 757)

The invention described herein may be manufactured and used by or for the Government for governmental purposes, without the payment to me of any royalty thereon.

The present invention relates to an improved track for a track laying vehicle and in particular to an improved track shoe therein.

An object of this invention is to provide a track having lugs or "grousers" for use in muddy, sandy or rocky terrain arranged in combination with resilient lugs on the track whereby the track might also be used on paved roads without much noise or destruction to the road and to provide novel means for the transmission of stresses throughout the individual track shoes in this universal application of the track.

Another object of this invention is to provide a novel arrangement of the link and lug or "grouser" elements in a track construction wherein, inter alia, the cleat performs the function of a clamping member for adjoining link pins as well as a member for the transmission of stresses from the track shoe frame to the link pins.

Another object of this invention is to provide a track shoe of the type wherein a link pin is separated from the track shoe frame by a resilient bushing and novel means are present for the transmission of stresses from the track shoe frame to the link pin.

Another object of this invention is to provide means for preventing undue stress on the resilient material forming a resilient bushing between a link pin and a track shoe frame in a track laying vehicle.

Another object of this invention is to provide a track shoe of the type having a link pin which is separated from the track shoe frame by means of a rubber bushing and in which no extraneous bonding element is necessary for the dissipation of electric charges which are produced in the operation of the track laying vehicle.

This invention is applied to a track shoe of the type having a structure similar to that which is described and claimed in my copending application, Serial No. 395,231, filed May 26, 1941, now Patent No. 2,301,954.

The specific nature of the invention as well as other objects and advantages thereof will clearly appear from a description of a preferred embodiment as shown in the accompanying drawings in which:

Fig. 1 is an inside plan view of a portion of the improved track.

Fig. 2 is a view in side elevation with parts in section taken substantially on line 2—2 of Fig. 1.

Fig. 3 is a view taken along the line 3—3 indicated in Fig. 2.

Fig. 4 is a side view of the assembly shown in Fig. 1 and a section taken substantially on line 4—4—4—4 of Fig. 1.

Fig. 5 is a fragmentary sectional view taken substantially along the line 5—5 of Fig. 2.

Fig. 6 is a side view of the upper portion of the outside link member 12.

Fig. 7 is a plan view of the shoe frame with the hardened rings or bushings 21 mounted thereon.

Fig. 8 is a view taken along the line 8—8 of Fig. 7.

Fig. 9 is a plan view of the lug, cleat or "grouser."

Fig. 10 is a view taken substantially along the line 10—10 of Fig. 9.

Fig. 11 is a plan view of the link pin.

Fig. 12 is an outside plan view of a portion of the improved track. The track is cut through the center and the left hand half is the same as the right hand half which is disclosed in this figure.

Fig. 13 is a view taken substantially on line 13—13 of Fig. 2.

Referring to the drawings wherein like numerals designate like parts, each individual shoe on the track is formed around the frame member A, Fig. 7. The steel alloy tubes 5 of the frame A are held in spaced relationship by the end members 6 which are brazed to the tubes, or the members 6 may be fastened by other similar means as by welding. A rubber bushing 7 inserted within the confines of each tube serves to allow rotational movement between the inserted link pin 8 and the tube 5 and also serves as a resilient connection between those two members.

Rubber or other resilient material 9 is attached to the frame A by vulcanization or other similar process and disposed on the frame as indicated on the drawings. The resilient material disposed on the top of the frame A serves as a cushion for the outer rim of a tank wheel (not shown). A relatively small amount of the resilient material extends below the bottom edge of the tubes as shown in Fig. 4, but the rubber portion or lug 9' (Figs. 5 and 12) located in the center of the shoe projects outwardly beyond any metallic member on the track by approximately $\frac{1}{8}''$ to $\frac{1}{16}''$. The rubber projection or lug 9' extends the entire distance between tubes 5 (Fig. 12), but the projections 9' may take a variety of forms and shapes and may extend only a fraction of the distance between tubes.

The ends of the pins 8 have a non-circular portion 8a thereon adapted to be engaged by a portion of a clamp which prevents adjoining pins on adjoining shoes from rotating. Adjoining pins of adjoining shoes are rigidly clamped against independent rotation by means of a clamp consisting of an upper member 12 having a flange 12b with pin encircling portions 12c, 12d adapted to have inserted therein non-circular portions 8a of the pin and the wedge-shaped cleat extension 10a being adapted to contact the non-circular portions 8a and receive the stud bolt 18 which passes through aperture 20 in the flange portion 12b into the tapped hole 17 in the cleat extension 10a.

Cleat extensions 10a as well as the connecting cleat portion 10b have ground engaging surfaces which are in the same plane, but the resilient lug 9' extends beyond that plane for the purpose of absorbing at least some of the shock when the vehicle travels on a hard road.

The upper clamping member 12 besides forming one element of the clamp described above has a projecting portion 12a adapted to serve as a wheel guide and has the flange 12b adapted to be engaged by a driving sprocket (not shown).

It is obvious from the description above that the "grouser" or cleat 10 besides performing the functions of such a device also serves to cooperate with the upper member 12 so as to serve as a clamping member for the adjoining pins of adjoining shoes.

In order that some of the track shoe stresses be transmited from the track shoe frame to the link pins other than through the rubber itself as in the prior art practise, each track shoe end plate 6 has two pressure rings or hardened bushings 21 (Figs. 2, 7 and 13) pressed thereon which are adapted to abut against the spaced frame hardened encircling portion 22 of the upper clamping member 12 when the stresses in the track are great enough to compress the rubber bushing 7 beyond a certain limit corresponding to the spacing between the hardened bushing 21 and encircling portion 22. This construction prevents undue stresses from being set up in the rubber bushing 7 and in particular prevents portions of the rubber bushing from being squeezed out in the vicinity of the ends of tube 5.

The clearance between the pressure ring or hardened bushing 21 and the encircling portion 22 of the end clamping member 12 is approximately .040", for example, so that in the operation of the track laying vehicle frequent contact is made between the bushing 21 and encircling portion 22 of the end clamping member; thus, the electrostatic charges formed between pin 8 and its corresponding track shoe tube 5 are neutralized periodically to such an extent that electric bonding clips between the tube and pin (similar to those described in the copending patent application of Arthur C. Hanson and Richard M. Howlett, Serial No. 363,460, filed October 30, 1940) are not necessary.

Lugs or reverse stops 6a (Fig. 8) are formed integral with the end plates 6 and are adapted to coact with cleat or grouser 10 so as to limit the amount of relative movement between adjoining shoes when the track is disassembled from the track laying vehicle.

I claim:

1. In a track with track shoes of the type having a pin passing through a metallic tube and elastic material spacing the pin from the tube, a clamp for clamping adjoining pins of adjoining shoes against independent rotation, said tube having a wear resistant surface, said clamp having a wear resistant portion adapted to partially encircle the tube wear resistant surface and spaced therefrom an amount commensurate with the degree of elasticity of the elastic material.

2. In a track with track shoes of the type having a pin passing through a metallic frame, elastic material spacing the pin from the frame, a clamp for clamping adjoining pins of adjoining shoes against independent rotation, said frame having a wear resistant portion, said clamp having a wear resistant portion adapted to contact the frame wear resistant portion and spaced therefrom an amount commensurate with the degree of elasticity of the elastic material.

3. In a track shoe of the type having a metallic frame, a pin passing through the frame, elastic material separating the pin from the frame, an extension on the frame having a wear resistant portion, an extension on the pin having a wear resistant portion adapted to contact the frame wear resistant portion and spaced therefrom an amount commensurate with the degree of elasticity of the elastic material.

4. In a bearing, a sleeve, a pin therein, elastic material interposed between and spacing the sleeve and pin, and rigid members carried by said sleeve and pin, said members being normally spaced and adapted to engage each other only when the elastic material has been stressed a predetermined amount which is in the elastic range of the elastic material.

5. In a track with track shoes of the type having a pin passing through a metallic tube and elastic material separating the pin from the tube, a plate connecting the pins, a member rigidly connecting the pins of adjoining shoes against independent rotation, said member having a wear-resistant portion, a wear-resistant portion on the plates and spaced from the first-mentioned wear-resistant portion, said portions being so spaced with respect to the elastic material as to be brought into engagement when the elastic material has been stressed to a predetermined point in its range to arrest the torsional stress on said material.

6. In a track shoe of the type having a metallic tube and a pin passing through the tube and elastic material separating the pin from the tube, plates connecting the tubes, a member rigidly connecting the pins of adjoining shoes against independent rotation, means carried by said member and means carried by the plates coacting to arrest the stress on the elastic material when it exceeds a predetermined amount in its range.

7. In a bearing, a sleeve, a pin therein, elastic material interposed between and spacing said sleeve and pin, extensions on said sleeve and pin having wear-resistant portions, said portions being normally spaced apart and adapted to engage to arrest the torsional strain on the elastic material when it exceeds a predetermined amount.

HARRY A. KNOX.